(12) United States Patent
Nakasha et al.

(10) Patent No.: US 12,374,934 B2
(45) Date of Patent: Jul. 29, 2025

(54) ELECTRONIC DEVICE, CONTROL METHOD, AND CONTROL PROGRAM

(71) Applicant: KYOCERA Corporation, Kyoto (JP)

(72) Inventors: Tomoyuki Nakasha, Yokohama (JP); Yuuya Tanaka, Yokohama (JP); Katsutoshi Kawai, Ichinomiya (JP)

(73) Assignee: KYOCERA Corporation, Kyoto (JP)

( * ) Notice: Subject to any disclaimer, the term of this patent is extended or adjusted under 35 U.S.C. 154(b) by 40 days.

(21) Appl. No.: 18/573,289

(22) PCT Filed: Jun. 27, 2022

(86) PCT No.: PCT/JP2022/025591
§ 371 (c)(1),
(2) Date: Dec. 21, 2023

(87) PCT Pub. No.: WO2023/276961
PCT Pub. Date: Jan. 5, 2023

(65) Prior Publication Data
US 2024/0291325 A1    Aug. 29, 2024

(30) Foreign Application Priority Data
Jun. 29, 2021    (JP) .................................. 2021-107935

(51) Int. Cl.
*H02J 50/60*    (2016.01)
*H02J 50/20*    (2016.01)

(52) U.S. Cl.
CPC .............. *H02J 50/60* (2016.02); *H02J 50/20* (2016.02)

(58) Field of Classification Search
CPC ........... H02J 50/20; H02J 50/60; Y02D 30/70
See application file for complete search history.

(56) References Cited

U.S. PATENT DOCUMENTS 10,008,875 B1 *    6/2018    Leabman ................ H02J 50/80

FOREIGN PATENT DOCUMENTS

JP    2020005469 A    1/2020

* cited by examiner

*Primary Examiner* — Jeffrey M Shin
(74) *Attorney, Agent, or Firm* — Studebaker Brackett PLLC (57) ABSTRACT

An electronic device according to one aspect includes: a transmitter configured to transmit a transmission signal; a receiver configured to receive a prescribed signal; an environment estimator configured to be able to estimate a radio wave propagation environment from the received prescribed signal; a person detector configured to detect the presence or absence of a person in the radio wave propagation environment; and a controller configured to reduce a side lobe of a transmission signal when the radio wave propagation environment is determined to be a multipath-rich environment in which reflected waves occur and a person is detected from an estimation result of the environment estimator and a detection result of the person detector.

5 Claims, 7 Drawing Sheets

FIG. 9

ELECTRONIC DEVICE, CONTROL METHOD, AND CONTROL PROGRAM

TECHNICAL FIELD

The present application relates to an electronic device, a control method, and a control program.

BACKGROUND OF INVENTION

Wireless power transmission has a technique for achieving both improvement in power supply efficiency and assurance of safety of the human body. For example, Patent Document 1 discloses a technique of detecting invasion of foreign matter such as a person entering a detection range based on a difference from environmental information indicating a normal environmental state where no foreign matter is present, and thereby avoiding erroneous detection even when a moving object is present in the normal environmental state.

CITATION LIST

Patent Literature

Patent Document 1: JP 2020-5469 A

SUMMARY

Problem to be Solved

For example, a high signal intensity may be confirmed in an unintended area affected by fading in a multipath-rich environment with many reflected waves, meaning there is room for improvement in the assurance of the safety of the human body. Fading is a phenomenon in which the intensity of a received radio wave changes due to a change in the state of mutual interference and the like.

Solution to Problem

An electronic device according to an aspect includes: a transmitter that transmits a transmission signal; a receiver that receives a prescribed signal; an environment estimator that is capable of estimating a radio wave propagation environment from the received prescribed signal; a person detector that detects the presence or absence of a person in the radio wave propagation environment; and a controller that reduces a side lobe of the transmission signal when the radio wave propagation environment is determined to be a multipath-rich environment in which reflected waves occur and a person is detected from an estimation result of the environment estimator and a detection result of the person detector.

A control method according to an aspect includes: at an electronic device including a transmitter that transmits a transmission signal and a receiver that receives a prescribed signal, estimating a radio wave propagation environment from the received prescribed signal; detecting the presence or absence of a person in the radio wave propagation environment; and reducing a side lobe of the transmission signal when the radio wave propagation environment is determined to be a multipath-rich environment in which reflected waves occur and a person is detected from an estimation result of the radio wave propagation environment and a detection result of the presence of absence of a person.

A control program according to an aspect is a program that causes an electronic device including a transmitter that transmits a transmission signal and a receiver that receives a prescribed signal to execute: estimating a radio wave propagation environment from the received prescribed signal; detecting the presence or absence of a person in the radio wave propagation environment; and reducing a side lobe of the transmission signal when the radio wave propagation environment is determined to be a multipath-rich environment in which reflected waves occur and a person is detected from an estimation result of the radio wave propagation environment and a detection result of the presence or absence of a person.

DESCRIPTION OF EMBODIMENTS

A plurality of embodiments for implementing an electronic device, a control method, a control program, and the like according to the present application will be described in detail with reference to the drawings. Note that the present application is not limited by the following description. Constituent elements in the following description include those that can be easily assumed by a person skilled in the art, those that are substantially identical to the constituent elements, and those within a so-called range of equivalents. In the following description, the same reference signs may be assigned to the same constituent elements.

Overlapping Description May be Omitted.

Figure 1:
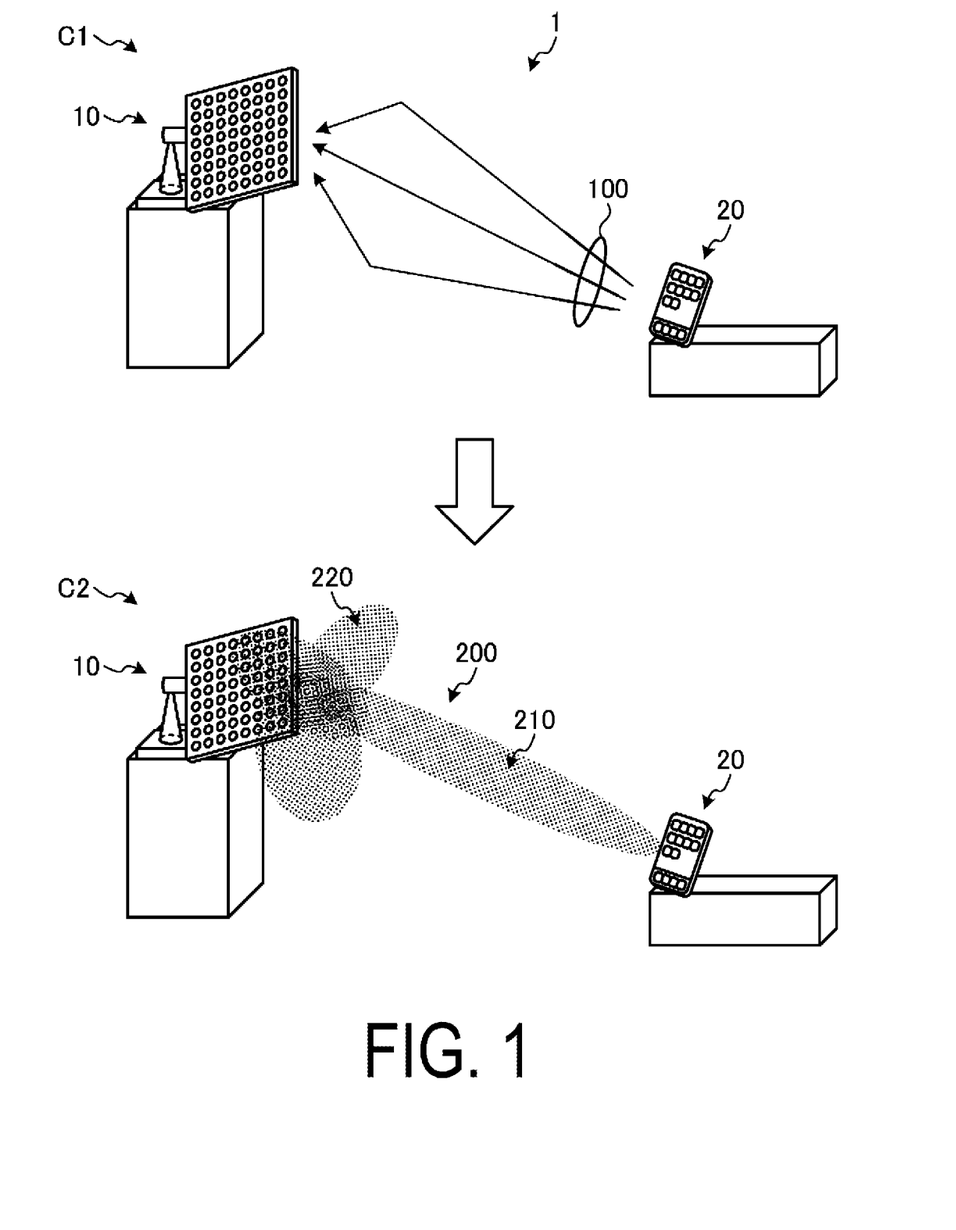
FIG. 1 is a diagram for describing an overview of a wireless power transmission system using an electronic device according to an embodiment.

FIG. 1 is a diagram for describing an overview of a wireless power transmission system using an electronic device according to an embodiment. A system 1 illustrated in FIG. 1 includes, for example, a wireless power transmission system capable of performing microwave transmission type (space transmission type) wireless power transmission. Wireless power transmission is a mechanism capable of transmitting power without using, for example, a cable or a plug. Since the microwave transmission type system 1 uses radio waves (microwaves) for energy transmission, the system 1 uses unmodulated waves in narrow frequency bands. The system 1 transmits power in a plurality of frequency bands, for example. The plurality of frequency bands include, for example, 920 MHz, 2.4 GHz, and 5.7 GHz in Japan. In the present embodiment, the system 1 enables both improvement in power supply efficiency suited to the situation and assurance of safety to be achieved. The system 1 can be applied to, for example, space-based solar generation. Note that in the wireless power transmission system according to the embodiment of the present disclosure, the frequency bands of radio waves to be used are not limited to the above microwaves, and radio waves having a wide wavelength from several meters to several pm may be used as the wavelengths of radio waves.

In the example illustrated in FIG. 1, the system 1 includes a master device 10 and a slave device 20. The master device 10 is a transmission device that transmits power in a wireless manner in the system 1. The master device 10 is a device capable of transmitting radio waves for power supply. The master device 10 is an example of an electronic device.

The master device 10 may use, for example, a Multiple-Input Multiple-Output (MIMO) antenna technology. In MIMO, antenna elements at each end of a communication circuit are combined to minimize errors and optimize data rates.

The slave device 20 is a power-supplied device that receives radio waves for power supply and obtains power in the system 1. Examples of the slave device 20 include a smartphone, a tablet terminal, an Internet of Things (IoT) sensor, a laptop personal computer, a drone, an electric vehicle, an electric bicycle, and a game machine. The system 1 may be able to manage usage of radio waves in a time division manner, a frequency division manner, or the like to avoid interference of the radio waves.

In a scene C1, the slave device 20 transmits a prescribed signal 100 that is determined between the slave device 20 and the master device 10. The prescribed signal 100 includes, for example, a beacon, and a pilot signal. The slave device 20 can transmit the prescribed signal 100 in a transmission cycle, for example. The slave device 20 can transmit the prescribed signal 100 by emitting radio waves including the prescribed signal 100. On the other hand, once the master device 10 receives the prescribed signal 100, the master device 10 estimates the position of the slave device 20 based on the prescribed signal. The master device 10 calculates a weight coefficient for transmission with respect to the estimated position of the slave device 20.

In a scene C2, the master device 10 performs directivity control on each antenna by multiplying the weight coefficient, and transmits radio waves of a transmission signal 200 for power supply. The directivity control means, for example, controlling a relationship between a radiation direction and a radiation intensity of the radio waves. Thus, the master device 10 radiates the radio waves in a radiation pattern having the radiation directivity. The master device 10 can radiate (transmit) the radio waves of the transmission signal 200 with a main lobe 210 directed to the slave device 20 and a side lobe 220 directed in a direction away from the slave device 20. The main lobe 210 indicates the strongest beam of the radiated radio waves of the transmission signal 200. The side lobe 220 indicates a beam other than the main lobe 210.

An area where the reception intensity is high only in the direction of the beam of the master device 10 occurs in a propagation environment in which direct waves are dominant, for example. On the other hand, an area where the reception intensity is high in directions other than the direction of the beam of the master device 10 occurs in a multipath-rich propagation environment due to the influence of wall surfaces, obstacles, and the like. For this reason, an area where the reception intensity is high in a direction different from the direction of the beam of the master device 10 may occur in the multipath-rich propagation environment, and the system 1 thus provides a function for an improvement in assuring safety of the human body.

Figure 2:
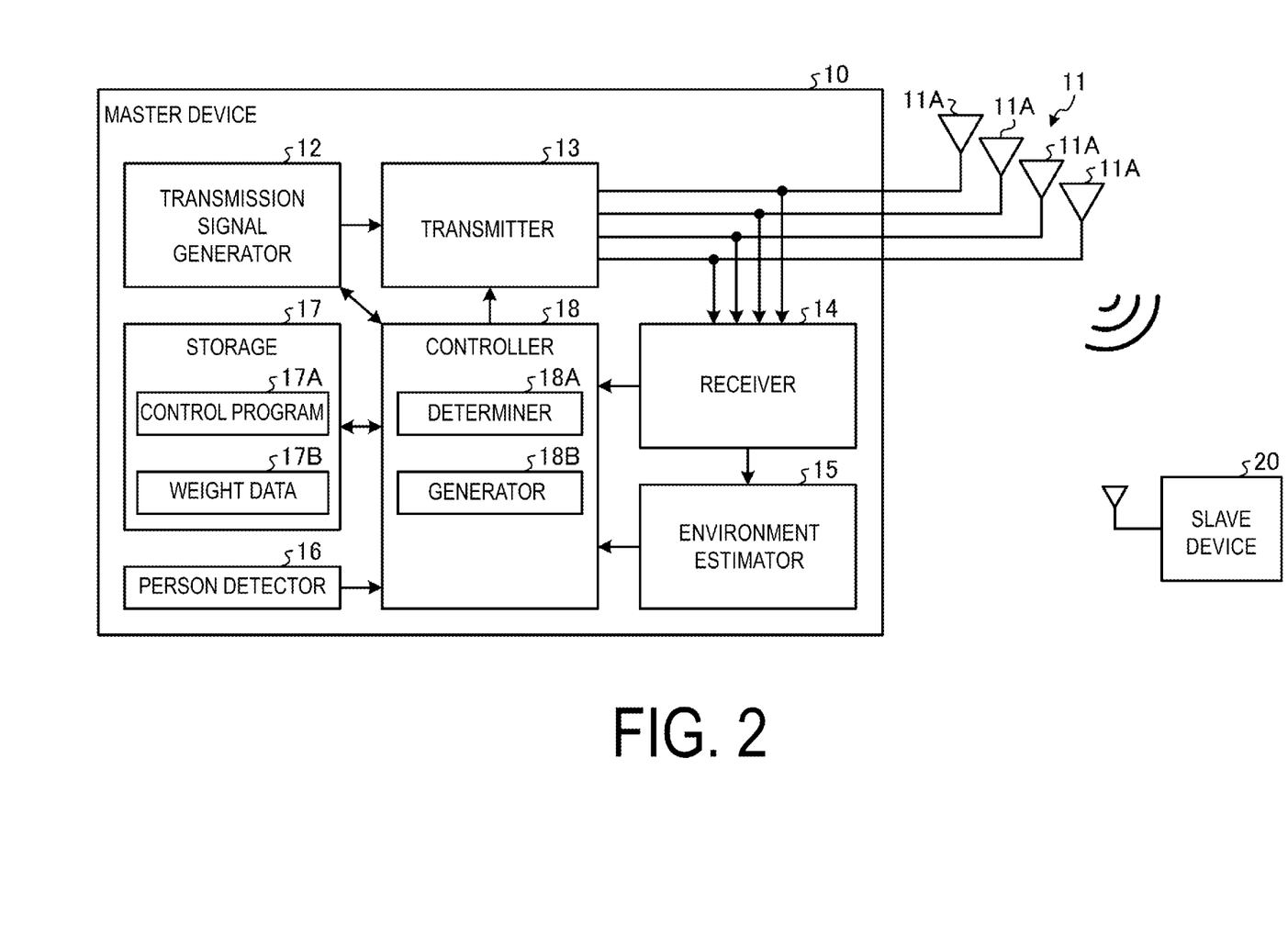
FIG. 2 is a diagram illustrating an example of a configuration of a master device according to the embodiment.

FIG. 2 is a diagram illustrating an example of a configuration of the master device 10 according to the embodiment. As illustrated in FIG. 2, the master device 10 includes an antenna 11, a transmission signal generator 12, a transmitter 13, a receiver 14, an environment estimator 15, a person detector 16, a storage 17, and a controller 18. The controller 18 is electrically connected to the transmission signal generator 12, the transmitter 13, the receiver 14, the environment estimator 15, the person detector 16, the storage 17, and the like.

Although a case where the antenna 11 includes four antenna elements 11A in the master device 10 will be described in the present embodiment in order to simplify the description, the number of antenna elements 11A is not limited thereto.

The antenna 11 is capable of performing directivity control (beam forming). The antenna 11 is an antenna array including the plurality of antenna elements 11A. The antenna 11 is capable of strengthening radio waves in a specific direction and causing the radio waves to cancel out each other and weaken the radio waves in other directions, by each of the plurality of antenna elements 11A emitting the same radio waves and by adjusting each phase and power intensity, for example. The antenna 11 emits radio waves including the transmission signal 200 and receives radio waves including a signal from a slave device 20. The antenna 11 supplies the received signal to the receiver 14. The antenna 11 is adapted such that a direction in which radiation with radio waves is maximized is the main lobe 210. The antenna 11 is adapted such that a direction intersecting the main lobe 210 is the side lobe 220. The transmission signal generator 12 generates the transmission signal 200 for power supply obtained by converting a current to be fed to the slave device 20 into radio waves. The transmission signal 200 is a signal for transmitting radio waves capable of supplying power. The transmission signal generator 12 converts a current from a power source into radio waves of a transmission frequency to generate the transmission signal 200. Examples of the power source include a commercial power source, a DC power source, and a battery. The transmission signal generator 12 transmits the generated transmission signal 200 to the transmitter 13.

The transmitter 13 is electrically connected to the plurality of antenna elements 11A of the antenna 11. The transmitter 13 causes the antenna 11 to emit radio waves including the transmission signal 200 for power supply. The transmitter 13 applies a weight corresponding to a beam that can be formed by the plurality of antenna elements 11A to cause the plurality of antenna elements 11A to emit radio waves in a specific direction. The transmitter 13 applies the weight designated by the controller 18 to the plurality of antenna elements 11A.

The receiver 14 is electrically connected to the plurality of antenna elements 11A of the antenna 11, the environment estimator 15, and the like. The receiver 14 extracts a reception signal from the radio waves from the slave device 20 received via the antenna 11. The reception signal includes, for example, the prescribed signal 100 described above. The receiver 14 supplies the extracted reception signal to the environment estimator 15, the controller 18, and the like.

The environment estimator 15 estimates a radio wave propagation environment from the known prescribed signal 100 received from the slave device 20. The radio wave propagation environment includes, for example, a space in which radio waves are propagated between the master device 10 and the slave device 20. The environment estimator 15 estimates, for example, a condition of radio wave propagation in the space. The condition of radio wave propagation includes, for example, a condition where an environment in which direct waves are dominant, a multipath-rich environment in which reflected waves occur, or the like is identifiable. The environment estimator 15 estimates a reception response vector (terminal arrival direction) from the reception signal. The environment estimator 15 estimates the reception response vector by comparing the known prescribed signal 100 included in the reception signal with a known reference signal, for example. The environment estimator 15, for example, estimates the propagation environment using a reception level of the prescribed signal 100, sensitivity, a reception response vector, a reference propagation model, a machine learning program, and the like in order to recognize the situation of radio wave propagation in the space. For example, when the loss of the received prescribed signal 100 is smaller than a determination threshold, the environment estimator 15 estimates the radio wave propagation environment to be an environment in which direct waves are dominant. For example, when the loss of the received prescribed signal 100 is equal to or greater than the determination threshold value, the environment estimator 15 estimates the radio wave propagation environment to be a multipath-rich environment. The environment estimator 15 supplies an estimation result based on the prescribed signal 100 to the controller 18.

The person detector 16 detects the presence or absence of a person in the radio wave propagation environment. The person detector 16 detects the presence or absence of a person in the radio wave propagation environment using, for example, a person sensor, a camera, or the like. The person detector 16 is provided so that the detection area thereof is at the height of a person, for example. The person detector 16 may be provided outside the master device 10 or may be provided inside the slave device 20. The person detector 16 supplies the detection result of the presence or absence of a person in the radio wave propagation environment to the controller 18. Note that the person detector 16 according to the present disclosure may also detect an animal such as a dog, a cat, a cow, a horse, a fish, or a bird, or a plant, food, medicine, clothing, or the like instead of or in addition to a person.

The storage 17 can store a program and data. The storage 17 may include a non-transitory storage medium of choice such as a semiconductor storage medium or a magnetic storage medium. The storage 17 may include a combination of a storage medium such as a memory card, an optical disc, or a magneto-optical disk, and a device for reading the storage medium. The storage 17 may include a storage device used as a temporary storage area such as a RAM.

The storage 17 can store a control program 17A, weight data 17B, and the like. The control program 17A can provide functions for implementing processing related to various operations of the master device 10. The control program 17A can provide various functions related to wireless power transmission. The weight data 17B includes, for example, data indicating a plurality of weights (weight coefficients) for adjusting amplitudes and phases of signals emitted from the plurality of antenna elements 11A of the antenna 11 for each of the plurality of directivity patterns. The weight data 17B includes, for example, data indicating a combination of the plurality of antenna elements 11A corresponding to the directivity patterns. The weight data 17B includes data indicating weights obtained by estimating temporal variations in reception response vectors by focusing on, for example, the fact that weight vectors (weight coefficient vectors) can be uniquely represented by the reception response vectors of the antenna elements 11A.

The controller 18 includes one or more computing devices. Although the computing devices include, for example, a Central Processing Unit (CPU), a System-on-a-Chip (SoC), a Micro Control Unit (MCU), a Field-Programmable Gate Array (FPGA), and a coprocessor, the computing devices are not limited thereto. The controller 18 realizes processing related to various operations of the master device 10 by causing the computing devices to execute the control program 17A. The controller 18 may realize at least some of the functions provided by the control program 17A by a dedicated integrated circuit (IC).

The controller 18 reduces the side lobe 220 of the transmission signal 200 when the radio wave propagation environment is determined to be a multipath-rich environment where reflected waves are generated and a person is detected from an estimation result of the environment estimator 15 and a detection result of the person detector 16, by executing the control program 17A. The reducing of the side lobe 220 means that the side lobe 220 is suppressed to curb occurrence of reflected waves, for example. The controller 18 performs directivity control of not reducing the side lobe 220 of the transmission signal 200 when the direct waves are determined to be dominant in the environment or the environment is determined to be a multipath-rich environment but no person has been detected from the estimation result of the environment estimator 15 and the detection result of the person detector 16. The directivity control of not reducing the side lobe 220 of the transmission signal 200 includes, for example, control of directivity of the main lobe 210 of the transmission signal 200.

For example, the controller 18 includes functional components of a determiner 18A and a generator 18B. The controller 18 functions as functional components such as the determiner 18A and the generator 18B by executing the control program 17A.

The determiner 18A determines a condition of the radio wave propagation environment from the estimation result of the environment estimator 15 and the detection result of the person detector 16. The determiner 18A determines directivity of the transmission signal 200 (radio waves) suited to the radio wave propagation environment. The determiner 18A determines that the side lobe 220 of the transmission signal 200 is to be reduced when the environment is determined to be a multipath-rich environment in which reflected waves occur and a person is detected, for example. The determiner 18A determines that the side lobe 220 of the transmission signal 200 is not to be reduced when direct waves are determined to be dominant in the environment or when the environment is determined to be a multipath-rich environment but no person has been detected.

The generator 18B generates a weight to be used for the transmission signal 200 based on the determination result of the determiner 18A. The generator 18B generates a weight based on the weight data 17B to make the amplitude of the transmission signal 200 non-uniform when safety of the human body safety is assured by reducing the side lobe 220, for example. The generator 18B generates a weight based on the weight data 17B to achieve a certain uniform amplitude for the purpose of enhancing maximum directivity gain and power supply efficiency when safety of the human body need not be assured by reducing the side lobe 220, for example.

The functional configuration example of the master device 10 according to the present embodiment has been described above. Note that the configuration described above using FIG. 2 is merely an example and the functional configuration of the master device 10 according to the present embodiment is not limited to the example. The functional configuration of the master device 10 according to the present embodiment can be flexibly modified in accordance with the specifications and application of the master device 10.

Figure 3:
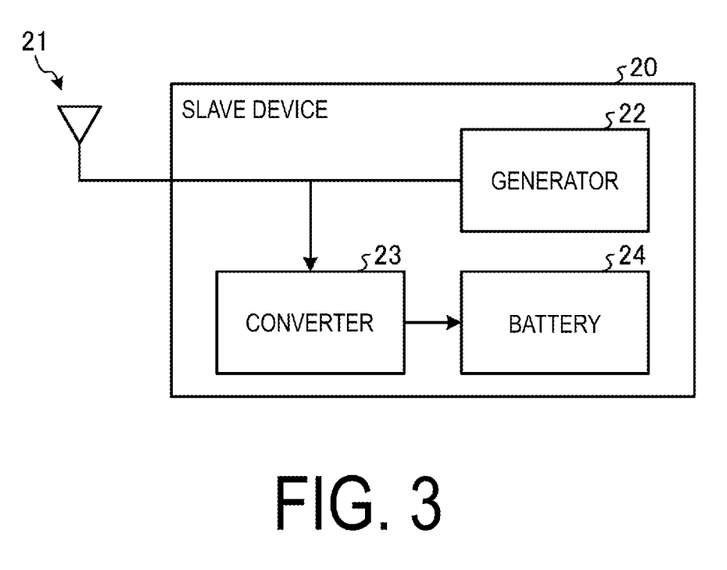
FIG. 3 is a diagram illustrating an example of a configuration of a slave device according to the embodiment.

FIG. 3 is a diagram illustrating an example of a configuration of the slave device 20 according to the embodiment. As illustrated in FIG. 3, the slave device 20 includes an antenna 21, a generator 22, a converter 23, and a battery 24.

The antenna 21 is electrically connected to the generator 22 and the converter 23. The antenna 21 emits radio waves including the prescribed signal 100 and receives radio waves including a signal from the master device 10, for example. The antenna 21 supplies the received radio wave to the converter 23.

The generator 22 generates the prescribed signal 100 and causes the antenna 21 to emit radio waves including the prescribed signal 100. The generator 22 generates the prescribed signal 100 at a predetermined time. The predetermined time includes, for example, a time at which a certain period of time has elapsed, and a designated time. The generator 22 may be configured to generate a signal different from the prescribed signal 100.

The converter 23 is electrically connected to the battery 24. The converter 23 converts radio waves received by the antenna 21 into a direct current and charges the battery 24 using the direct current. The converter 23 converts the radio waves into a direct current using, for example, a known rectification circuit.

The battery 24 is electrically connected to the converter 23. The battery 24 includes a rechargeable battery. The battery 24 includes, for example, a battery corresponding to Qi (an international standard for wireless power supply). The battery 24 can supply the stored power to each component or the like that requires power in the slave device 20.

The functional configuration example of the slave device 20 according to the present embodiment has been described above. Note that the configuration described above using FIG. 3 is merely an example and the functional configuration of the slave device 20 according to the present embodiment is not limited thereto. The functional configuration of the slave device 20 according to the present embodiment can be flexibly modified in accordance with the specifications and application of the slave device 20.

Figure 4:
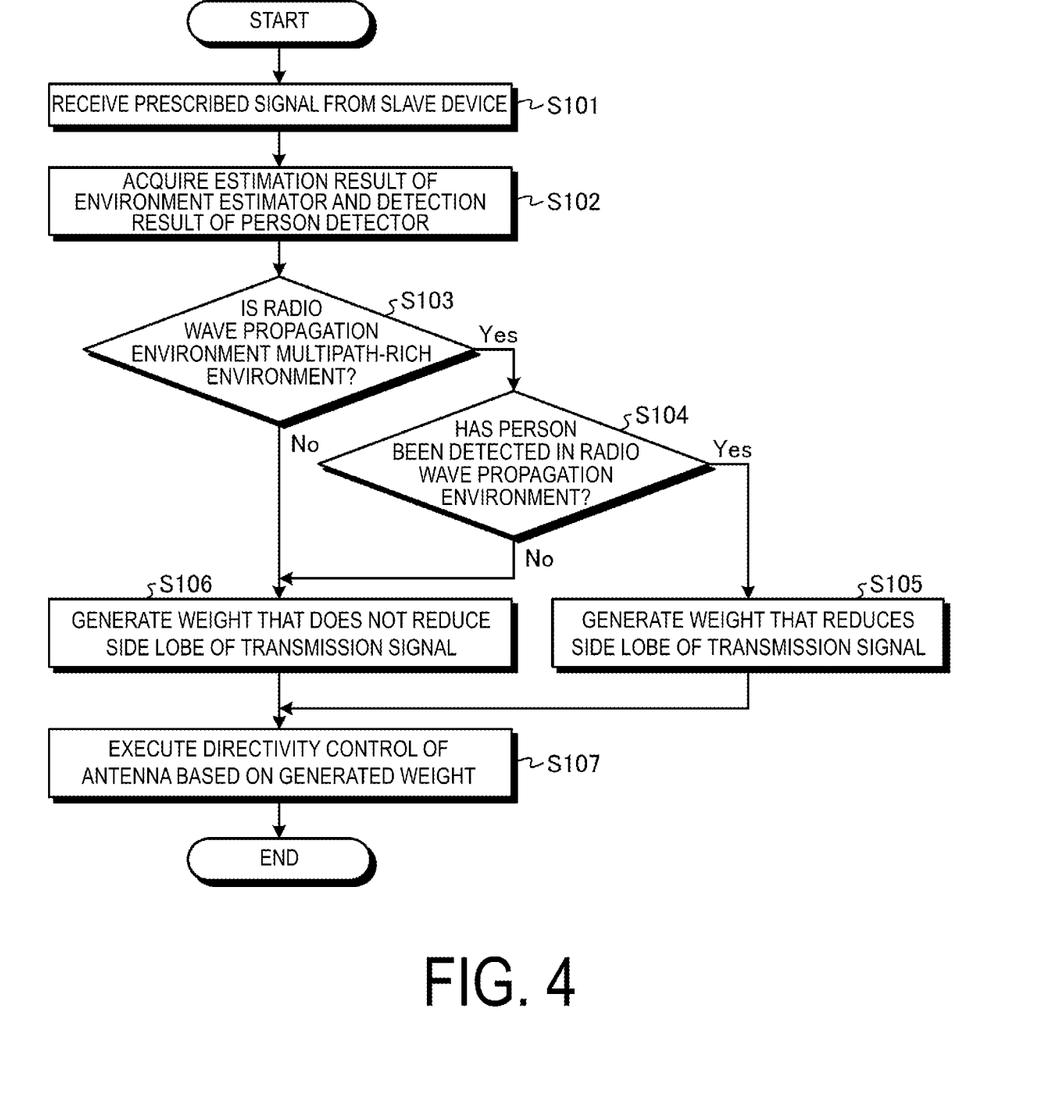
FIG. 4 is a flowchart illustrating an example of a processing procedure executed by the master device according to the embodiment.

FIG. 4 is a flowchart illustrating an example of a processing procedure executed by the master device 10 according to the embodiment. The processing procedure illustrated in FIG. 4 is implemented by the controller 18 of the master device 10 executing the control program 17A. The processing procedure illustrated in FIG. 4 is repeatedly executed by the controller 18 at a time when radio waves are received or the like when the radio waves are received by the antenna 11, for example.

As illustrated in FIG. 4, the controller 18 of the master device 10 receives the prescribed signal 100 from the slave device 20 (Step S101). For example, the controller 18 acquires the prescribed signal 100 from the radio waves received by the antenna 11. Upon completion of the processing in step S101, the controller 18 causes the processing to proceed to step S102.

The controller 18 acquires an estimation result the environment estimator 15 and a detection result of the person detector 16 (Step S102). For example, the controller 18 stores the estimation result acquired from the environment estimator 15 and the detection result acquired from the person detector 16 in an associated manner in the storage 17. Upon completion of the processing in step S102, the controller 18 causes the processing to proceed to step S103.

The controller 18 determines whether the radio wave propagation environment is a multipath-rich environment (Step S103). For example, the controller 18 determines that the radio wave propagation environment is a multipath-rich environment when the estimation result of the environment estimator 15 indicates a multipath-rich environment. The controller 18 moves on to the processing in Step S106 when the radio wave propagation environment is determined not to be a multipath-rich environment (No in Step S103). The controller 18 moves on to the processing in Step S104 when the radio wave propagation environment is determined to be a multipath-rich environment (Yes in Step S103).

The controller 18 determines whether a person has been detected in the radio wave propagation environment (Step S104). For example, the controller 18 determines that a person has been detected in the radio wave propagation environment when the detection result of the person detector 16 indicates that a person has been detected. The controller 18 moves on to the processing in Step S105 when determining that a person has been detected in the radio wave propagation environment (Yes in Step S104).

The controller 18 generates a weight for reducing the side lobe 220 of the transmission signal 200 (Step S105). For example, the controller 18 generates the weight based on the weight data 17B to make the amplitude of the transmission signal 200 non-uniform and stores the weight in the storage 17. Upon completion of the process in step S105, the controller 18 causes the processing to proceed to step S107 to be described later.

The controller 18 moves on to the processing in Step S106 when determining that no person has been detected in the radio wave propagation environment (No in Step S104). The controller 18 generates a weight for not reducing the side lobe 220 of the transmission signal 200 (Step S106). For example, the controller 18 generates the weight based on the weight data 17B to achieve a certain uniform amplitude for the purpose of enhancing a maximum directivity gain and power supply efficiency, and stores the weight in the storage 17. Upon completion of the processing in step S106, the controller 18 causes the processing to proceed to step S107.

The controller 18 executes directivity control of the antenna 11 based on the generated weight (Step S107). For example, the controller 18 sets the generated weight in the transmitter 13 and causes the antenna 11 to emit radio waves including the transmission signals 200 generated by the transmission signal generator 12. In this manner, the controller 18 achieve the emission of the radio waves in which directivity of the main lobe 210 and the side lobe 220 of the transmission signal 200 are adjusted. Upon completion of the processing in Step S107, the controller 18 terminates the processing procedure illustrated in FIG. 4.

Figure 5:
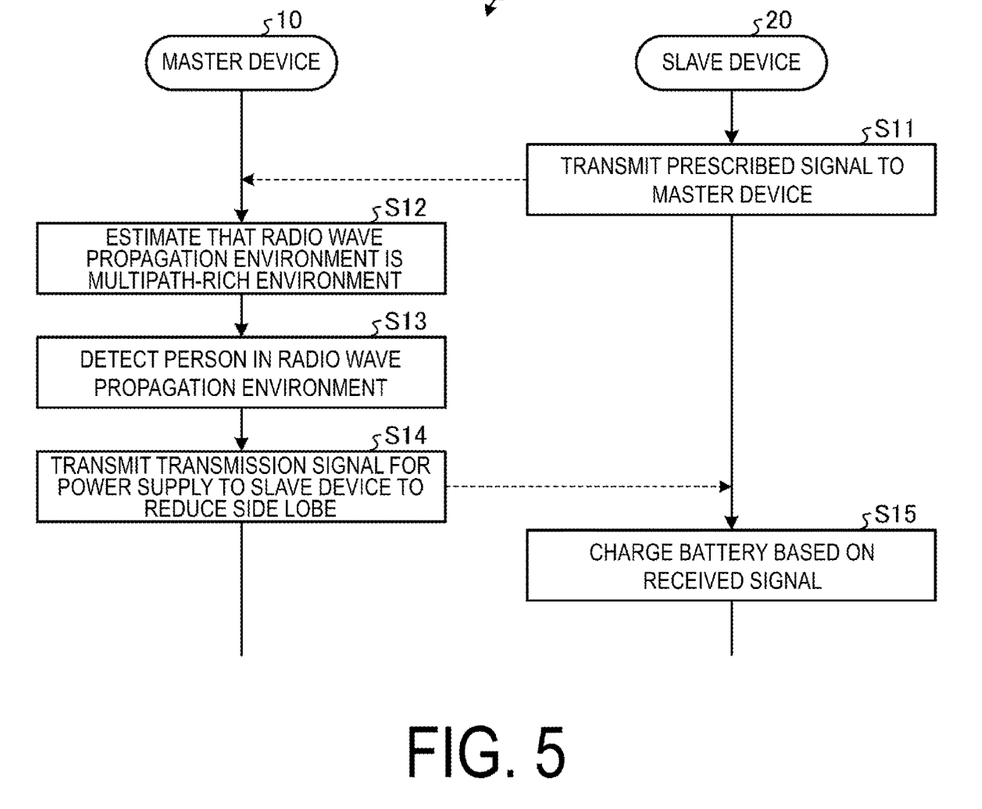
FIG. 5 is a diagram illustrating an example of a sequence of the system illustrated in FIG. 1.
Figure 6:
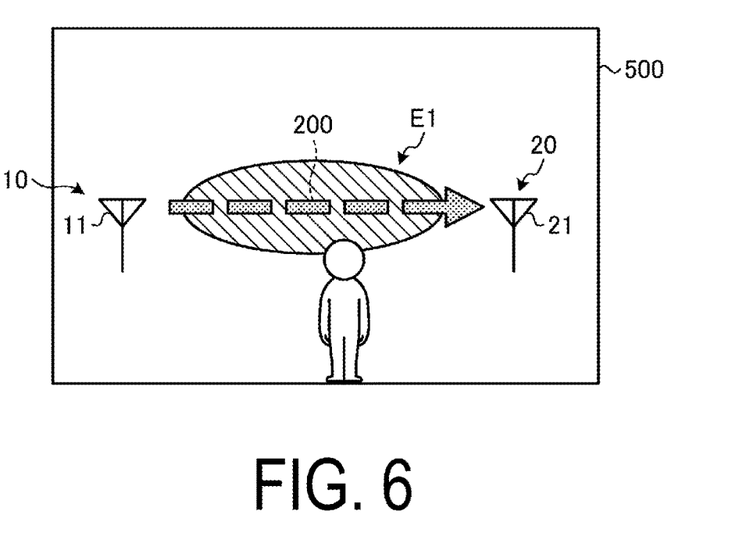
FIG. 6 is a diagram for explaining an example of an operation of the system illustrated in FIG. 1.

FIG. 5 is a diagram illustrating an example of a sequence of the system 1 illustrated in FIG. 1. FIG. 6 is a diagram for explaining an example of an operation of the system 1 illustrated in FIG. 1. In the examples illustrated in FIGS. 5 and 6, it is assumed that for the system 1 that the master device 10 and the slave device 20 are provided inside a radio wave propagation environment and a person is present in the radio wave propagation environment.

As illustrated in FIG. 5, the slave device 20 transmits the prescribed signal 100 to the master device 10 in response to starting wireless power supply (Step S11). In this manner, the slave device 20 emits radio waves including the prescribed signal 100 from the antenna 21.

The master device 10 estimates the radio wave propagation environment to be a multipath-rich environment based on the prescribed signal 100 received via the antenna 11 (Step S12). The master device 10 detects a person in the radio wave propagation environment through the person detector 16 (Step S13). The master device 10 transmits the transmission signal 200 for power supply to the slave device to reduce the side lobe 220 (Step S14). In this manner, the master device 10 emits the radio waves including the transmission signal 200 and having the reduced side lobe 220 from the antenna 11 to the slave device 20.

The slave device 20 charges the battery 24 based on the received signal (Step S15). For example, the slave device 20 converts the received signal into a direct current by the converter 23 and charges the battery 24 using the direct current.

As illustrated in FIG. 6, the master device 10 transmits the transmission signal 200 with the reduced side lobe 220 to the slave device 20 when the radio wave propagation environment 500 is a multipath-rich environment and a person is detected in a radio wave propagation environment 500. In this case, an area E1 with high radio wave intensity is generated in the direction of the radio waves (main lobe 210) of the transmission signal 200 from the master device 10 between the master device 10 and the slave device 20 in the radio wave propagation environment 500. As a result, the system 1 can assure safety of the human body in an area that is different from the area E1 of the radio wave propagation environment 500 and curb degradation of power supply efficiency.

Figure 7:
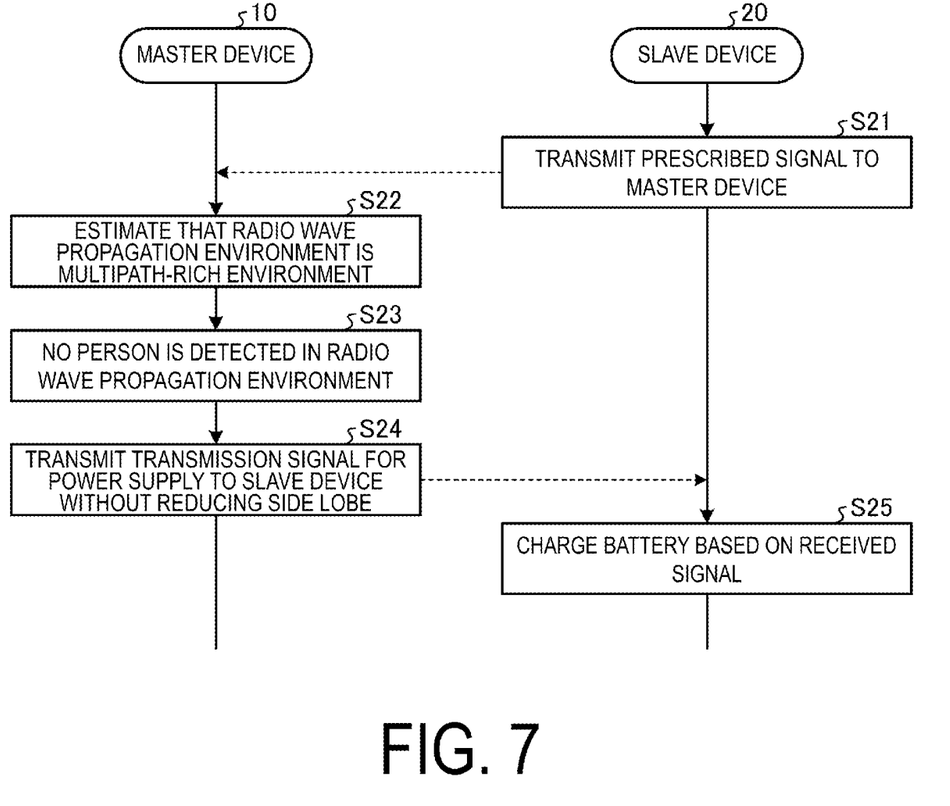
FIG. 7 is a diagram illustrating another example of the sequence of the system illustrated in FIG. 1.
Figure 8:
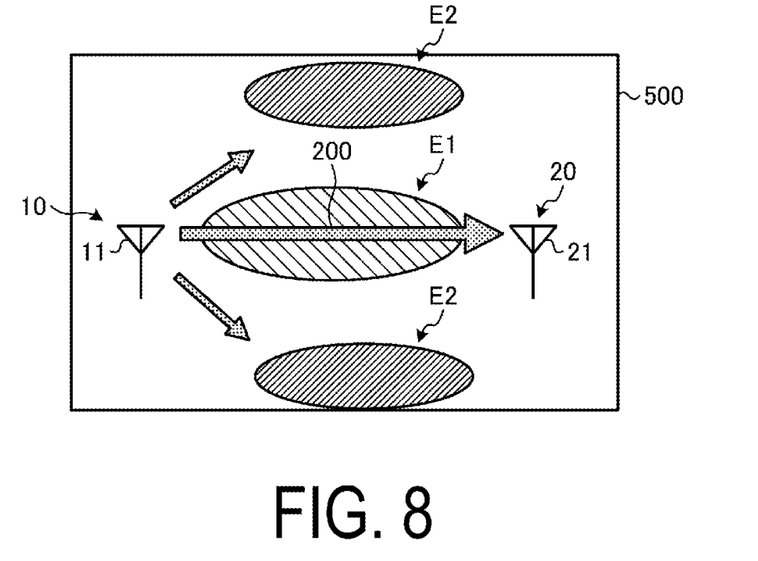
FIG. 8 is a diagram for explaining another example of the operation of the system illustrated in FIG. 1.

FIG. 7 is a diagram illustrating another example of the sequence of the system 1 illustrated in FIG. 1. FIG. 8 is a diagram for explaining another example of the operation of the system 1 illustrated in FIG. 1. In the examples illustrated in FIGS. 7 and 8, it is assumed for the system 1 that the master device 10 and the slave device 20 are provided inside a radio wave propagation environment and no person is present in the radio wave propagation environment 500.

As illustrated in FIG. 7, the slave device 20 transmits the prescribed signal 100 to the master device 10 in response to starting wireless power supply (Step S21). In this manner, the slave device 20 emits radio waves including the prescribed signal 100 from the antenna 21.

The master device 10 estimates that the radio wave propagation environment 500 is a multipath-rich environment based on the prescribed signal 100 received via the antenna 11 (Step S22). The master device 10 does not detect any person in the radio wave propagation environment 500 through the person detector 16 (Step S23). The master device 10 transmits the transmission signal 200 for power supply to the slave device without reducing the side lobe 220 (Step S24). In this manner, the master device 10 emits radio waves including the transmission signal 200 and having the side lobe 220 not reduced from the antenna 11 to the slave device 20.

The slave device 20 charges the battery 24 based on the received signal (Step S25). For example, the slave device 20 converts the received signal into a direct current by the converter 23 and charges the battery 24 using the direct current.

When the radio wave propagation environment 500 is a multipath-rich environment, and no person has been detected in the radio wave propagation environment 500 as illustrated in FIG. 8, the master device 10 transmits the transmission signal 200 with the side lobe 220 not reduced to the slave device 20. In this case, the area E1 where radio wave intensity is high occurs in the direction of the radio waves (main lobe 210) of the transmission signal 200 from the master device 10 between the master device 10 and the slave device 20 and an unintended area E2 occurs due to fading in the radio wave propagation environment 500. The area E2 is an area where the radio wave intensity is lower than in the area E1. Thus, in the multipath-rich environment, since the system 1 does not reduce the side lobe 220 when no person is present in the radio wave propagation environment 500, the system 1 can improve a directivity gain of the main lobe 210 more than when the side lobe 220 is reduced. As a result, the system 1 can improve power supply efficiency in the slave device 20 more than when the side lobe 220 is reduced.

Figure 9:
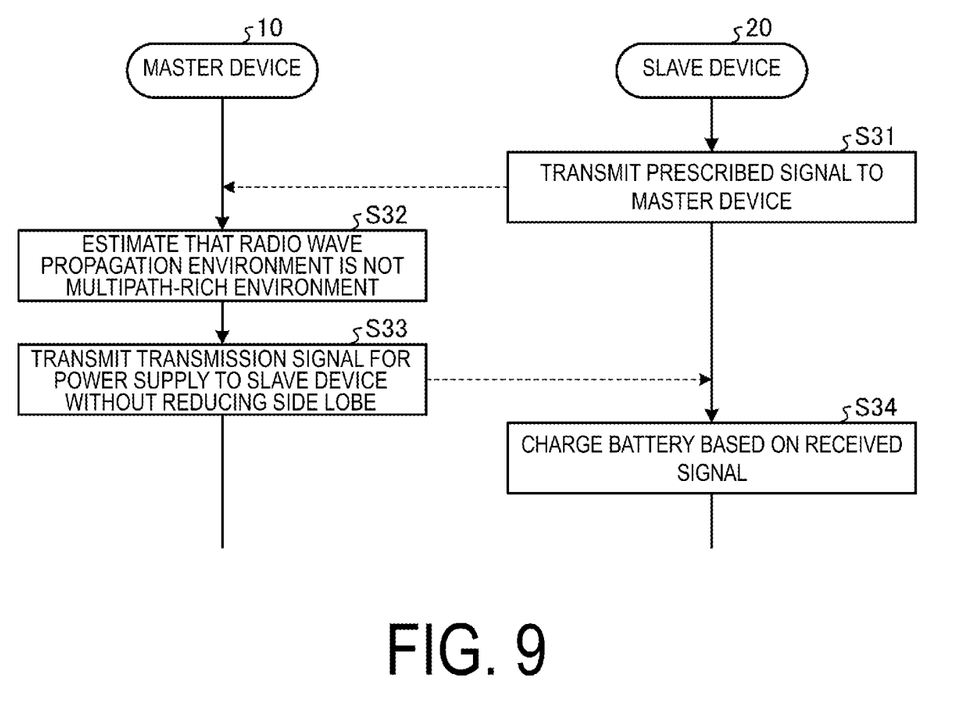
FIG. 9 is a diagram illustrating another example of the sequence of the system illustrated in FIG. 1.

FIG. 9 is a diagram illustrating another example of the sequence of the system 1 illustrated in FIG. 1. In the example illustrated in FIG. 9, it is assumed for the system 1 that the master device 10 and the slave device 20 are provided inside the radio wave propagation environment 500 and the environment is not a multipath-rich environment.

As illustrated in FIG. 9, the slave device 20 transmits the prescribed signal 100 to the master device 10 in response to starting wireless power supply (Step S31). In this manner, the slave device 20 emits radio waves including the prescribed signal 100 from the antenna 21.

The master device 10 estimates that the radio wave propagation environment 500 is not a multipath-rich environment based on the prescribed signal 100 received via the antenna 11 (Step S32). The master device 10 transmits the transmission signal 200 for power supply to the slave device without reducing the side lobe 220 (Step S33). In this manner, the master device 10 emits radio waves including the transmission signal 200 and having the side lobe 220 not reduced from the antenna 11 to the slave device 20.

The slave device 20 charges the battery 24 based on the received signal (Step S34). For example, the slave device 20 converts the received signal into a direct current by the converter 23 and charges the battery 24 using the direct current.

When the radio wave propagation environment 500 is not a multipath-rich environment, the master device 10 transmits a transmission signal 200 with the side lobe 220 not reduced to the slave device 20. In this case, the area E1 with high radio wave intensity occurs in the direction of the radio waves (main lobe 210) of the transmission signal 200 from the master device 10 between the master device 10 and the slave device 20 as illustrated in FIG. 6 in the radio wave propagation environment 500. In this manner, the system 1 does not reduce the side lobe 220 when direct waves are dominant in the environment and can thus improve a directivity gain of the main lobe 210 more than when the side lobe 220 is reduced. As a result, the system 1 can improve power supply efficiency in the slave device 20 more than when the side lobe 220 is reduced.

In the system 1, upon reducing the side lobe 220 of the radio waves, the directivity gain of the main lobe 210 decreases more than when the side lobe 220 is not reduced, causing the efficiency to decrease as described above. Therefore, the system 1 reduces the side lobe 220 of the radio waves only when the system 1 estimates that the radio wave propagation environment 500 is a multipath-rich environment from the prescribed signal 100 and detects a person in the radio wave propagation environment 500. The system 1 does not reduce the side lobe 220 of the radio waves in a case where the system 1 estimates that the radio wave propagation environment 500 is a multipath-rich environment form the prescribed signal 100 and has not detected any person in the radio wave propagation environment 500. In this manner, the system 1 changes the side lobe 220 of the radio waves in accordance with the condition of the radio wave propagation environment 500 and thereby achieves both an improvement in power supply efficiency and assuring safety of the human body.

The field of wireless communication, the radio wave propagation environment 500 varying moment by moment is known, and the condition between the master device 10 and the slave device 20 may also change every moment. Therefore, the master device 10 reduces the side lobe 220 of the radio waves only when the master device estimates that the radio wave propagation environment 500 is a multipath-rich environment from the prescribed signal 100 and has detected a person in the radio wave propagation environment 500. Thus, the master device 10 can assure safety of the human body even if the condition of the radio wave propagation environment 500 varies moment by moment.

As described above, the aforementioned master device 10 can reduce the side lobe 220 of the transmission signal 200 when the master device 10 estimates that the radio wave propagation environment 500 is a multipath-rich environment from the prescribed signal 100 received from the slave device 20 and a person has been detected in the radio wave propagation environment 500. Accordingly, the master device 10 reduces the side lobe 220 of the radio waves of the transmission signal 200 when a person is present in the multipath-rich environment and can thus assure safety of the human body.

The master device 10 performs directivity control of not reducing the side lobe 220 of the transmission signal 200 when direct waves are determined to be dominant in the environment or when the environment is determined to be a multipath-rich environment but no person has been detected. In this manner, the master device 10 can control curbing of the side lobe 220 based on a condition of the radio wave propagation environment 500 or the presence or absence of a person, and can thus achieve both transmission efficiency of radio waves in the space and assuring safety of the human body.

In the master device 10, the transmission signal 200 is a signal transmitting radio waves capable of supplying power. In this manner, the master device 10 can control curbing of the side lobe 220 based on the condition of the radio wave propagation environment 500 or the presence or absence of a person, and can thus achieve both power transmission efficiency in the space and assuring safety of the human body.

The system 1 reduces the side lobe 220 of the transmission signal 200 when the master device 10 estimates that the radio wave propagation environment 500 is a multipath-rich environment form the prescribed signal 100 received from the slave device 20 and a person has been detected in the radio wave propagation environment 500. In the system 1, the slave device 20 transmits the prescribed signal 100 to the master device 10, radio waves received from the master device 10 are converted into a current, and the battery 24 is charged with the current. In this manner, the system 1 can control curbing of the side lobe 220 based on the condition of the radio wave propagation environment 500 or the presence or absence of a human and can thus achieve both power transmission efficiency in the space and assuring safety of the human body.

Although a case where the master device 10 is an electronic device in the system 1 has been described in the above embodiment, the present disclosure is not limited thereto. The electronic device may be implemented by a control device that controls a power supply device capable of emitting power supply radio waves or a computer incorporated in a power supply device, for example. Although a case where the system 1 is a wireless power transmission system has been described, the present disclosure is not limited thereto. For example, the system 1 can be applied to a system or the like that performs wireless communication in a radio wave propagation environment.

Embodiments have been described in order to fully and clearly disclose the technique according to the appended claims. However, the appended claims are not to be limited to the embodiments described above and may be configured to embody all variations and alternative configurations that those skilled in the art may make within the underlying matter set forth herein. Details of the present disclosure can be modified and amended by those skilled in the art in various manners based on the present disclosure. Therefore, the modifications and amendments are included in the scope of the present disclosure. For example, each functional component, each means, each step, or the like in each embodiment may be added to another embodiment so that no theoretical conflict occurs or may be replaced with each functional component, each means, each step, or the like in another embodiment. A plurality of functional components, means, steps, or the like may be combined into one or may be split in each embodiment. Each of the aforementioned embodiments of the present disclosure is not limited to implementation of each embodiment in the exact manner as described above, and the embodiments may be implemented by appropriately combining features or omitting some of the features.

Supplementary Note 4

A power transmission system including:
    an electronic device; and
    a power-supplied device to which power is supplied by radio waves received from the electronic device,
    in which the electronic device includes:
    a transmitter that transmits a transmission signal;
    a receiver that receives a prescribed signal;
    an environment estimator that is capable of estimating a radio wave propagation environment from the received prescribed signal;
    a person detector that detects the presence or absence of a person in the radio wave propagation environment; and
    a controller that reduces a side lobe of the transmission signal when the radio wave propagation environment is determined to be a multipath-rich environment in which reflected waves occur and a person is detected from an estimation result of the environment estimator and a detection result of the person detector, and
    the power-supplied device includes:
    a second transmitter that transmits the prescribed signal;
    a converter that converts the radio waves received from the electronic device into a current; and
    a battery configured to be charged with the converted current.

REFERENCE SIGNS

1 System
10 Master device
11 Antenna

12 Transmission signal generator
13 Transmitter
14 Receiver
15 Environment estimator
16 Person detector
17 Storage
17A Control program
17B Weight data
18 Controller
18A Determiner
18B Generator
20 Slave device
21 Antenna
22 Generator
23 Converter
24 Battery
100 Prescribed signal
200 Transmission signal
210 Main lobe
220 Side lobe

The invention claimed is:

1. An electronic device comprising:
   a transmitter configured to transmit a transmission signal;
   a receiver configured to receive a prescribed signal;
   an environment estimator configured to estimate a radio wave propagation environment from the received prescribed signal;
   a person detector configured to detect the presence or absence of a person in the radio wave propagation environment; and
   a controller configured to reduce a side lobe of the transmission signal when the radio wave propagation environment is determined to be a multipath-rich environment in which reflected waves occur and a person is detected from an estimation result of the environment estimator and a detection result of the person detector.

2. The electronic device according to claim 1, wherein the controller performs directivity control of not reducing the side lobe of the transmission signal when direct waves are determined to be dominant in the environment or when the radio wave propagation environment is determined to be a multipath-rich environment but no person has been detected from the estimation result of the environment estimator and the detection result of the person detector.

3. The electronic device according to claim 1, wherein the transmission signal is a signal that transmits radio waves supplying power.

4. A control method comprising:
   at an electronic device comprising a transmitter configured to transmit a transmission signal and a receiver configured to receive a prescribed signal, estimating a radio wave propagation environment from the received prescribed signal;
   detecting the presence or absence of a person in the radio wave propagation environment; and
   reducing a side lobe of the transmission signal when the radio wave propagation environment is determined to be a multipath-rich environment in which reflected waves occur and a person is detected from an estimation result of the radio wave propagation environment and a detection result of the presence or absence of the person.

5. A control program that causes an electronic device comprising a transmitter configured to transmit a transmission signal and
   a receiver configured to receive a prescribed signal to execute:
   estimating a radio wave propagation environment from the received prescribed signal;
   detecting the presence or absence of a person in the radio wave propagation environment; and
   reducing a side lobe of the transmission signal when the radio wave propagation environment is determined to be a multipath-rich environment in which reflected waves occur and a person is detected from an estimation result of the radio wave propagation environment and a detection result of the presence or absence of the person.

* * * * *